United States Patent
Kanevsky et al.

(10) Patent No.: US 7,899,646 A0
(45) Date of Patent: Mar. 1, 2011

(54) METHOD FOR COMPARING A VALUE TO A THRESHOLD IN THE PRESENCE OF UNCERTAINTY

(75) Inventors: Valery Kanevsky, San Lorenzo, CA (US); Bruce Hamilton, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 1573 days.

(21) Appl. No.: 10/979,387

(22) Filed: Nov. 2, 2004

(65) Prior Publication Data

US 2006/0095229 A1 May 4, 2006

(51) Int. Cl.
*G06F 17/00* (2006.01)
(52) U.S. Cl. .................. 702/181; 702/179; 702/185
(58) Field of Classification Search .................. 702/181, 702/33–35, 57–59, 127, 179, 183–185; 405/7
See application file for complete search history.

(56) References Cited

U.S. PATENT DOCUMENTS

| | | | | |
|---|---|---|---|---|
| 5,109,435 A | | 4/1992 | Lo et al. | 382/103 |
| 6,167,352 A | * | 12/2000 | Kanevsky et al. | 702/81 |
| 6,853,952 B2 | * | 2/2005 | Chadwick | 702/181 |
| 2003/0149657 A1 | * | 8/2003 | Reynolds et al. | 705/38 |

OTHER PUBLICATIONS

Foreign Search Report dated Feb. 28, 2006 (3 pages).

* cited by examiner

*Primary Examiner* — Hal Wachsman (57) ABSTRACT

A method for deciding the relationship between a physical property and a threshold, comprising measuring a physical property to obtain a measured value, calculating the distribution of actual values for the physical property, calculating the error distribution of the obtained measured value, calculating the penalty associated with an erroneous decision, and calculating a margin based on the expected loss from selecting at least one possible actual value as a function of the calculated distribution of actual values, the calculated error distribution of the measured value, and the calculated penalty associated with an erroneous decision. Embodiments including a system and apparatus are also disclosed.

20 Claims, 4 Drawing Sheets

METHOD FOR COMPARING A VALUE TO A THRESHOLD IN THE PRESENCE OF UNCERTAINTY

BACKGROUND OF THE INVENTION

The measurement of any physical property, whether the measurement is taken by a human or a machine, always includes uncertainty or error. In some cases, the act of measuring itself induces error, as taught by the famous Heisenberg uncertainty principle used frequently in quantum applications. In other cases, instruments or sensory capabilities cannot provide accurate measurements beyond a certain threshold. For example, a human being is capable of measuring the speed of a moving vehicle by observing the vehicle's motion. A human's estimate of the speed might be accurate to within 10 miles per hour, but cannot be as accurate as the measurement made by a radar gun. In this example, a vehicle's speed would be calculated by the human as, for example, 50 miles per hour plus or minus 10 miles per hour. However, a radar gun would measure the same vehicle's speed as, for example, 54 miles per hour plus or minus 1 mile per hour.

In many applications requiring measurement of physical properties, measurement error is ignored. A carpenter measuring a board with a standard tape measure can accurately measure distances to within $\frac{1}{16}^{th}$ of an inch. In almost all applications, the carpenter can ignore the $\frac{1}{16}^{th}$ of an inch error without ill effects. But there are many measurements that require exacting accuracy to avoid consequences. In these situations, ignoring a measurement's error can have very costly effects. More accurate measuring instruments can reduce the error to a level where it can safely be ignored, but the cost of measurement instrumentation rises as the accuracy of the instrumentation improves.

In many measurement situations, a measurement is taken to determine whether the actual value X is greater than or equal to some threshold T ($X \geq T$). However the actual value X is elusive, and most applications must use a measured value Y that includes some measurement error e. If the error present in Y is not taken into account, several disadvantages are present:

1. If the actual value is less than the threshold, X<T, but the measurement error is large enough, the measured value will indicate $Y \geq T$ and produces an incorrect decision.

2. A corresponding disadvantage occurs if X>T but the measurement error has a large enough negative value. In this case, the measured value will indicate $Y \leq T$ and produces an incorrect decision.

3. A measurement scheme that does not account for measurement error has no way of tuning or weighting the cost of error. That is, the user of such a scheme has no way to adjust for the relative cost of the two types of error (i.e. a false positive and a false negative). For example, in the case of a hot water boiler, if the measured value of a boiler's internal pressure is greater than a set threshold, a relief valve will open to avoid a catastrophic overpressure explosion. In the boiler example, the consequences of a false negative (measured pressure is less than threshold because of negative error, but actual pressure is above threshold so the boiler explodes) are much higher than the consequences of a false positive (measured pressure is greater than threshold because of positive error, but actual pressure is below threshold so steam is vented prematurely to relieve pressure).

4. A measurement scheme that does not account for measurement error ignores the a priori probability of the actual value being equal to or greater than a threshold. For example, in the case of a very high threshold, the actual value of a property may be less than a threshold in almost all cases, so that any measured values of that property exceeding the threshold are almost certainly the result of measurement error. Accordingly, this scheme makes a wrong decision with high probability.

Some prior art methods add or subtract the standard deviation (a) of the uncertainty of a measured value from a threshold to which the measured value is compared. Using the boiler example, this scheme would test for $Y \geq T-\tau$, rather than $Y \geq T$, where Y is the measured pressure value and T is the threshold. This scheme accepts more false positives in return for fewer false negatives. In situations where a false positive is more costly, the user can test for $Y \geq T+\tau$. This scheme avoids disadvantages 1 and 2 above by automatically adjusting as the error variance becomes larger or smaller, and partly avoids disadvantage 3 in that the user can weight one type of error more heavily than the other. However, it does not allow a user to specify how much to weight one type of error over another. This scheme does not avoid disadvantage 4 as there is no provision accounting for the distribution of actual values compared to a threshold.

Ignoring the error of a measured property can be costly in other ways. In a manufacturing setting, measurement errors are often accounted for by setting a lower threshold for discarding a product. For example, if a manufactured resistor must have a value of 100 ohms and measurements can only return a value of plus or minus 5 ohms, in any situation where the actual value of the resistor must be greater than or equal to 100 ohms, all resistors with measured values of 105 ohms or less must be discarded. In this example and in many present scenarios, buying a measurement system of greater accuracy is a large capital expense. Therefore, methods that would better account for measurement error and the associated costs of the error are needed.

BRIEF SUMMARY OF THE INVENTION

The present invention is directed to systems and methods which comprise general-purpose applications for basing decisions on measurements. Measurement uncertainty is considered and taken into account by embodiments of the invention. Embodiments of the invention treat a measured physical property value as a random quantity with some known distribution. Certain embodiments of the present invention take into the account the error or uncertainty of a measured value, and the a priori likelihood that the property being measured is greater than or less than a threshold in order to determine the likelihood of the actual value of the property being greater or less than the threshold.

In other embodiments, a measured value is treated as a variable that has a random noise added to it. The result is a random variable representing the reported value. A threshold is assigned and a cost is determined for cases where the reported value is above the threshold but the actual value is below the threshold. In other embodiments, a threshold is assigned and a cost is determined for cases where the reported value is below the threshold but the actual value is above the threshold. Embodiments of the invention also apply in cases where the actual value is greater than or equal to the threshold, less than or equal to the threshold, not equal to the threshold, or equal to the threshold. Costs are determined based on decisions resulting from logical comparisons in preferred embodiments.

Other embodiments of the invention comprise a two-threshold system. These embodiments can be used, for example, in a manufacturing process where a manufacturing process must ensure that a property is kept between two limits. In addition to a two-threshold system, certain embodiments comprise comparing a reported value to a variable threshold.

Certain embodiments of the invention comprise a method that measures a physical property to obtain a measured value and calculates the distribution of actual values, the error distribution, and the penalties associated with at least one erroneous decision. The distributions and penalties are used to calculate the expected loss from selecting at least one possible actual value. The expected loss is used to calculate a margin that can be used to modify a threshold value, which modified value will be compared to a second measurement of the physical property. Multiple measurements of the physical property are compared to the modified threshold in certain embodiments. The same physical property is measured on different devices or products in certain embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Embodiments of the invention pertain to systems which control and/or monitor physical things. These systems are found in many environments and applications such as factories and/or production applications, laboratories, cars, houses, et cetera. In physical systems there is always uncertainty in the measured value of physical properties. When a measured value is compared with a desired threshold, the measurement uncertainty needs to be taken into account, particularly when there is a cost associated with an erroneous decision based on a measurement.

Methods that allow applications requiring measurement of physical properties and comparison of the measurements to a threshold to minimize the cost of false negatives and false positives are needed. These methods are used, for example, in control systems that tell machinery when to turn on a pump or let water out of a tank. These methods are also used in measurement systems, such as, for example, systems used in a manufacturing setting where a measurement is compared to a threshold to determine whether a product meets desired performance specifications and if the product can be used or should be discarded.

In applications with many measurements being taken by monitoring and/or control equipment, embodiments of the invention allow measurements to be shared among computing devices, manufacturing equipment, or human controllers without considering the source of the measurement. Shared reported measurements generated according to embodiments of the invention that have been used to calculate potential losses due to erroneous measurements can be transferred freely among monitoring and/or control equipment minimizing any error propagation effects.

The present invention comprises embodiments that measure tangible physical properties such as, for example, length, temperature, resistance, frequency, speed, volume, weight, et cetera. Measurements are taken with machines or devices in preferred embodiments of the invention. However, certain embodiments use measurements taken by living organisms. Embodiments of the invention are intended for use with measurements that are approximations of the actual value of a physical property. The "actual value" of a physical property is almost always approximated from a measured value in measurement systems, as even the most accurate measurements possible incorporate some measurement error (i.e., have limited accuracy). The measured value of the physical property is stored in a computer memory in certain embodiments of the present invention. In other embodiments, the measured value is memorized or recorded.

Figure 1:
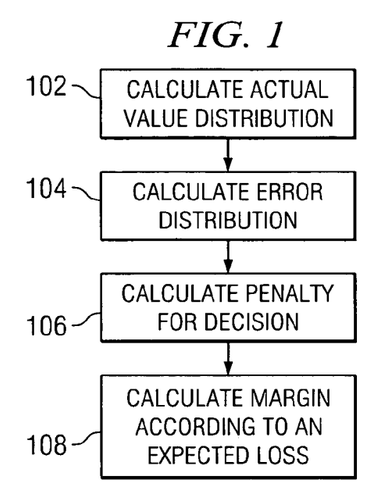
FIG. 1 is a flow diagram of a value comparison method according to an embodiment of the present invention.

FIG. 1 is a flow diagram of a method according to an embodiment of the present invention for calculating a margin based on the expected losses from a decision. In process 102, the actual value distribution for a physical property is calculated. The actual value distribution is calculated in one embodiment by generating or referring to a statistical representation of possible values. The actual value distributions utilized with embodiments of the invention vary, and may be of a uniform distribution around a central value, such as, for example, a bell curve, or may be of another distribution form such as a skewed form. A skewed distribution is analyzed in FIG. 9. For example, if a measured value for the resistance of a resistor is 100 ohms, an exemplary statistical distribution shows that the actual value of the resistance varies from 91 ohms to 108 ohms, with actual values near 100 ohms occurring more frequently than values farther away from 100 ohms. The actual value distribution is calculated in certain embodiments by examining data from previous measurements of the physical property. In other embodiments, the actual value distribution is estimated considering parameters such as, for example, application environment, operational demands, et cetera. The actual value distribution of the physical property can be stored in computer memory in certain embodiments.

In process 104, the error distribution of measured values for the physical property is calculated. The error distribution is reported as a few fixed real numbers (e.g. mean and standard deviation) in preferred embodiments of the invention. In certain embodiments, the error distribution is calculated based on historical measurements of a measured value. The error distribution of measured values is reported as a standard deviation in certain embodiments. The error distribution can be provided by an instrument manufacturer or by calibration measurements relative to a known standard value. The error distribution of the obtained measured value is stored in a computer memory in certain embodiments of the present invention.

In process 106, the penalty associated with an erroneous decision is calculated. The decision considered will report the relation of an actual value of a property compared to a threshold. In preferred embodiments of the invention, penalty calculations are performed using a penalty function. Penalties are determined by examining the effects of a false positive and/or a false negative decision. For example, the effects of a decision that selects a false positive when considering whether a physical property value is above or below a threshold are determined. The corresponding penalty for a decision that selects a false negative for the same threshold comparison is then calculated. Other logical relationships are considered in certain embodiments of the invention, such as, for example, whether a physical property value is greater than, less than, equal to, greater than or equal to, less than or equal to, and not equal to a threshold. As an example, in the case of a boiler, if a measurement of a boiler's internal pressure is greater than a set threshold, a relief valve must open to avoid a catastrophic overpressure explosion. In the boiler example, the consequences of a false negative (measured pressure is below threshold, but actual pressure is above threshold so the boiler explodes) are much higher than the consequences of a false positive (measured pressure is above threshold, but actual pressure is below threshold so steam is vented prematurely to relieve pressure). Accordingly, embodiments of the present invention would assign a larger penalty to the case of deciding that the value was not greater than the threshold when it actually was (false negative, with boiler explosion). These embodiments would assign a smaller penalty to the case of deciding that the value was greater than the threshold when it actually was not (false positive, premature venting of steam). The penalty calculation can be modified in other embodiments to take into account the intended application for a product. For example, in a manufacturing application, penalties for an incorrect decision about a part when used in a transistor radio will change when the same part is used in an aerospace application.

In process 108, a margin is calculated according to an expected loss. The margin is an arbitrary, but fixed number. The expected loss is calculated as a function of the calculated actual value distribution, the calculated error distribution of the measured value, and the calculated penalty associated with an erroneous decision from the previous processes. Exemplary calculations that return margins in embodiments of the invention are shown below under the heading "Examples." The expected loss can be reported as, for example, a dollar figure loss estimate for the selection of a decision. In certain embodiments, a margin is varied to affect the penalty associated with a decision resulting from a comparison of a property to a threshold modified by the margin. In preferred embodiments, margins are selected to minimize the expected loss associated with a decision following comparison of a property to the threshold modified by the margin. In certain embodiments, margins calculated in process 108 are used together with the embodiment illustrated in FIG. 2. In certain embodiments of the invention, the reported value is used in an arithmetic function together with other reported or measured values of physical properties. The result of the function is used to make threshold determinations in certain embodiments of the present invention.

Figure 2:
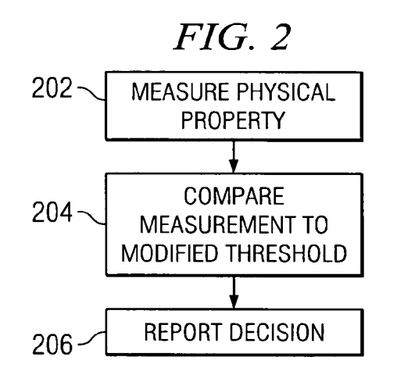
FIG. 2 illustrates an embodiment of the invention where a margin calculated in an embodiment according to FIG. 1 is used to make a decision comparing a property value to a threshold modified by a margin.

FIG. 2 illustrates an embodiment of the invention where a margin calculated in an embodiment according to FIG. 1 is used to make a decision comparing a property value to a threshold modified by a margin. The margin selected in a preferred embodiment accounts for the inaccuracies of the measurement system in a most cost-effective way (e.g., to ensure that the system errs by the most cost-saving amount). In process 202, a measurement is taken of a physical property. In a preferred embodiment, the measurement is taken by a computerized device that is communicatively coupled to other computerized devices. In other embodiments, a measurement is taken by a human, a device, an integrated device, et cetera. In certain embodiments, the physical property measured will be one associated with a device under test (DUT). A DUT is a manufactured product that is required to meet standards set by physical property thresholds. In process 204, the measurement taken in process 202 is compared to a threshold modified by a selected margin. The selected margin is calculated according to embodiments of the invention, such as the embodiment illustrated in FIG. 1. The comparison in preferred embodiments reports a logical relationship such as, for example, whether a physical property value is greater than, less than, equal to, greater than or equal to, less than or equal to, or not equal to a threshold modified by a selected margin.

In process 206, the decision made in process 204 is reported. The decision is reported in a preferred embodiment as the answer to a relational comparison. For example, a decision can report whether a measurement taken in process 200 is less than or equal to a threshold modified by a selected margin. This decision is made by a device in preferred embodiments and reported to other devices. In certain embodiments, the decision is made by an integrated device. In other embodiments, the decision is made by a human or humans.

Certain embodiments of the invention comprise integrated measurement systems that pass provided reported decisions back and forth and/or perform arithmetic functions on the results of measurements. Because embodiments of the present invention determine the costs of reporting a particular decision resulting from a comparison of a measured value to a threshold, any device to which a decision is transferred does not need to consider the source of the value or any measurement error associated with the source. The processes of FIGS. 1 and 2 are repeated for more than one physical property in certain embodiments of the invention. Also, other embodiments of the invention perform the processes of FIG. 1 in a different order, or perform additional processes such as, for example, the processes of FIG. 2. The processes of FIG. 2 are repeated many times in certain embodiments of the invention, particularly in manufacturing applications where the physical property or properties of different devices are compared to a modified threshold.

Figure 3:
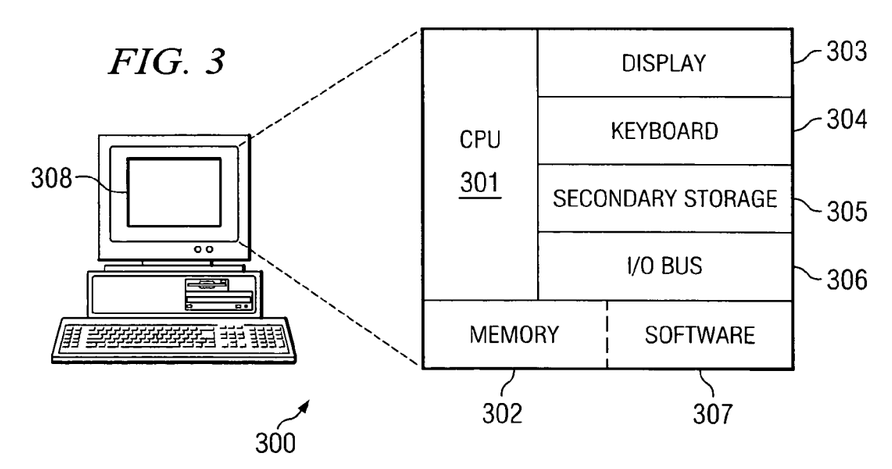
FIG. 3 is a schematic diagram of an apparatus that may perform measurement comparisons according to an embodiment of the present invention.

FIG. 3 is a block diagram of an apparatus that performs measurements and/or reports decisions according to an embodiment of the invention. An apparatus 300 may include Central Processing Unit (CPU) 301, memory 302 connected to CPU 301, display subsystem 303, keyboard or other input device 304, and secondary storage device 305. Display subsystem 303 may be a CRT display, LCD display, or any such device for communicating with a user. Display subsystem 303 may also display user interface 308 generated by software 307 residing in memory 302. In certain embodiments, software resides in secondary storage device 305 (e.g., floppy disk, CD-RW, etc). In a preferred embodiment, software 307 resides at least partially in memory 302. Software 307 in a preferred embodiment of the invention comprises a computer program product for performing the processes described above in FIGS. 1 and 2. Software 307 is written in a machine-readable code, such as, for example, assembly language, binary code, C++, or other languages known to those of ordinary skill in the art. Apparatus 300 comprises an I/O bus 306 for interacting with a process control system and/or a process monitoring system in certain embodiments of the present invention. For example, a computing device comprising software for performing a method according to an embodiment of the invention is connected (e.g., via a communication network, such as a LAN, WAN, or the Internet) to a monitoring system that measures a physical property of a product. As a product is manufactured, the monitoring system measures a physical property of the product. The measurement is communicated (e.g., via the communication network) to apparatus 300 which then uses the measured value to report a decision. In this embodiment, the measured value is compared to a threshold plus a margin, and the device is discarded if the value is not higher than the threshold plus margin. Further examples are discussed below.

EXAMPLES

I. Example 1

One-Threshold Embodiment

In a method according to one embodiment of the invention, a measured property is compared to a single threshold. In this example, it is desired to detect the case of the measured property equaling or exceeding the single threshold. In this example, there are two random variables Y and X, such that $$Y=X+e, \qquad (1)$$

where e is also random with a given distribution. X is routinely referred to as a signal, Y is a measurement of the signal, and e is a measurement error, where e can have a positive or negative value. It is assumed that value(s) of Y are the only information accessible to an observer. In this example, a simple two-state alarm system is used, with the state of the alarm dependent on the value of the measured value compared to a single threshold T. In preferred embodiments, T is selected by a user to meet some criteria for the specific environment being monitored and/or controlled. In this example, it is desired to detect the event $\{X \geq T\}$ based on the occurrence of the event $\{Y \geq T+\mu\}$, where $\mu$ is an arbitrary but fixed real number (frequently called a margin). A decision rule is then defined as a map $D(Y, T, \mu)$, which is simply an indicator function of the event $\{Y \geq T+\mu\}$. A penalty function for calculating the penalty associated with an erroneous selection of actual value is defined as:

$$Q(Y, X, T, \mu) = \begin{cases} a_1 & \text{if } D = 1, J = 0 \\ a_2 & \text{if } D = 0, J = 1 \end{cases} \qquad (2)$$

where J is an indicator function of the event $\{X \geq T\}$. In other words, penalties are applied for both a false positive, i.e. $\{D=1, J=0\}$ and for a false negative, i.e. $\{D=0, J=1\}$. The expected loss $L=L(\mu, T)$ for a given decision rule is therefore the expectation of Q, or $$L = EQ(Y, X, T, \mu) = a_1 P\{D=1, J=1\} + a_2 P\{D=0, J=1\}. \qquad (3)$$

Under this scenario the objective is to find a value $\mu_0$ of $\mu$ that minimizes $L(\mu)$, i.e.:

$$\mu_0 = \text{Argmin}(L(\mu)) \qquad (4)$$

where $\mu_0$ is a function of T. Consequently, the minimal value $L(\mu_0, T) = L(\mu_0(T))$ of the loss function itself becomes a function of the threshold T. Certain embodiments of the invention minimize $L(\mu_0(T))$ with respect to T. The latter function is equivalent to minimization of $L(\mu, T)$ with respect to both variables $(\mu, T)$ simultaneously. In a special case when $a_1=a_2=1$, loss function $L(\mu, T)$ is a probability of misdiagnosis. This case is described below, and the general situation does not cause any additional complications.

From the definition of L in (3) above, compute $$P\{D=1, J=0\} = P\{Y \geq T+\mu, X<T\} = P\{e \geq T+\mu-X, X<T\}. \qquad (5)$$

If a total probability formula representing the distribution of actual values of the property is applied to the right hand side of (5), keeping in mind the independence of e and X, the following equation results $$P\{D = 0, j + 0\} = \int_{-\infty}^{T} (1 - \Phi(T + \mu - x)) f(x) dx \qquad (6)$$

where $\Phi(t)=P\{e<t\}$ is a known distribution function of e, and $f(x)=F'(x)$ is also known density distribution function of X. Similarly, $$P\{D = 0, j = 1\} = \int_{T}^{\infty} \Phi(T + \mu - x) f(x) dx. \qquad (7)$$

Combining (3, 6 and 7) results in $$L(\mu) = \int_{-\infty}^{T} (1 - \Phi(T + \mu - x)) f(x) dx + \int_{T}^{\infty} \Phi(T + \mu - x) f(x) dx \qquad (8)$$

which is an explicit expression for the loss function. Minimization of $L(\mu)$ in (8) if $\Phi(t)$ belongs to a "decent" class of functions (e.g. uniform distribution, normal distribution) is well known in the art. The calculation of the expected loss from selecting a given decision for the physical property can be used to select an appropriate alarm state for the application.

Certain embodiments of the present invention comprise computer program products that perform processes according to embodiments of the present invention. These computer program products implement the mathematical process detailed above in certain embodiments. Other embodiments of the invention comprise apparatus and methods that implement the mathematical process detailed above.

II. Example 2

Two-Threshold Embodiment

Other embodiments of the invention similar to the embodiment presented in equations 2, 3, and 5–8 above can be extended to two-threshold embodiments. This is useful for measurement systems in which it is desired to detect when a quantity falls outside a fixed range, and control systems which try to keep a quantity between two limits.

Let $(T^*, \mu^*)$ and $(T^*, \mu^*)$ be upper and lower thresholds, respectively, along with the corresponding margins. The alarm triggering event in this case is a union of two events—one for each threshold: $\{Y<T_*-\mu_*\} \cup \{Y>T^*+\mu^*\}$. False positive and/or false negative alarm events may occur at both thresholds of the operational interval. Therefore, the loss function comprises four terms instead of two in the case of one threshold (8). The total probability formula (6) is replaced by $$P\{D=1, j=0\} = \int_{T_*}^{T^*} (\Phi(T_* - \mu_* - x))f(x)\,dx + \int_{T_*}^{T^*} (1 - \Phi(T^* + \mu^* - x))f(x)\,dx \quad (9)$$

and (7) by $$P\{D=0, j=1\} = \int_{-\infty}^{T} (\Phi(T^* + \mu^* - x) - \Phi(T_* + \mu_* - x))f(x)\,dx + \int_{T^*}^{\infty} (\Phi(T^* + \mu^* - x) - \Phi(T_* - \mu_* - x))f(x)\,dx. \quad (10)$$

Now the loss function is $$L(\mu_*, \mu^*) = \int_{T_*}^{T^*} (\Phi(T_* - \mu_* - x)f(x)\,dx + \int_{T_*}^{T^*} (1 - \Phi(T^* + \mu^* - x)f(x)\,dx + \int_{-\infty}^{T_*} (\Phi(T^* + \mu^* - x) - \Phi(T_* + \mu_* - x))f(x)\,dx + \int_{T^*}^{\infty} (\Phi(T^* + \mu^* - x) - \Phi(T_* - \mu_* - x))f(x)\,dx \quad (11)$$

As expected, (11) is reduced to (8) if T* is set to −∞. To find the "best" values for μ*,μ* requires solving a two-variable optimization problem. As in the one-threshold embodiment, if Φ(t) belongs to a "decent" class of functions (e.g. uniform distribution, normal distribution) solving this equation is well known in the art. The case for X≦T is now simply (11) with T* set to +∞. The case for S=T is the case where T*=T*. Other cases are similarly straightforward applications of (11).

III. Variable Threshold Embodiment

Certain embodiments of the invention comprise setting a variable threshold for comparing a reported result. Other embodiments comprise computer readable program code for receiving a variable threshold with a measurement error distribution.

This method can be further extended to cases in which T is a variable measured quantity like X, with its own measurement error distribution. This scenario may occur when, for example, the setting of a threshold is corrupted by noise.

FIGS. 4–8 are graphic illustrations of the probability of a false positive or false negative for different values of μ considering a threshold T and the question of whether Y (the measured value)>T+μ. For these figures, variable X representing the actual value is uniformly distributed between 0 and 1 (0<X<1), and the measurement error e has zero mean and standard deviation of 0.1. These figures are exemplary only and aid in understanding the embodiments of the invention discussed herein.

Figure 4:
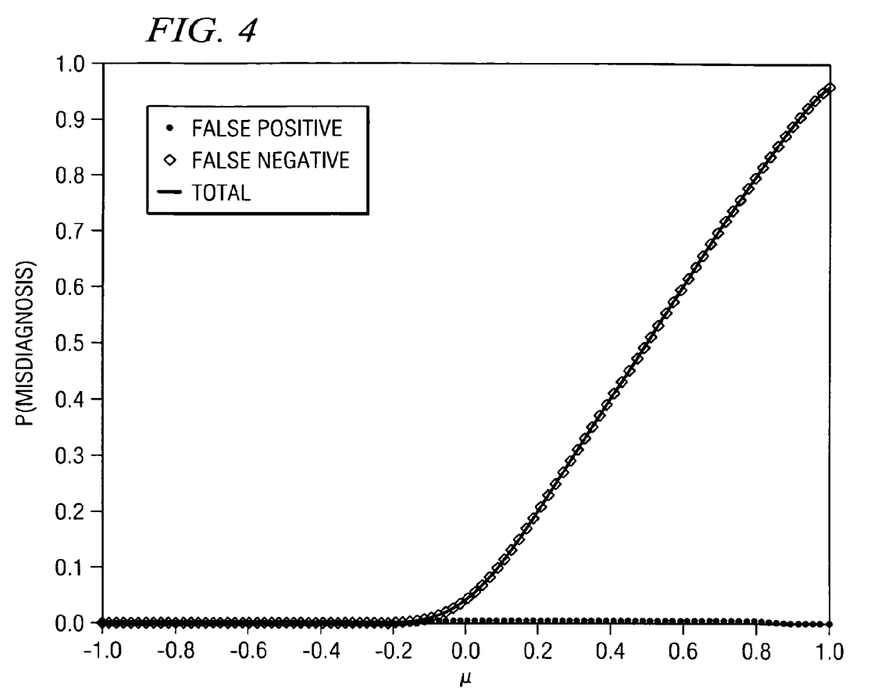
FIGS. 4–9 show error probability graphs to aid in understanding embodiments of the invention.

FIG. 4 shows an error probability graph for a threshold set at 0. Since X is always greater than the threshold, there is never a false positive in this case, as all values of X are greater than the threshold. A false negative can be produced by making μ large enough. In the case of μ=0.5, the question asked is whether Y>0.5. This will be false about half of the time. But because X is always greater than T, these negatives are false negatives. In FIG. 4, with μ=0.5, the dots lie on the bottom, indicating P(false positive)=0, and the diamonds reach P(false negative)=0.5 at about u=0.5. If μ=1, then the question to be answered is whether Y>1. This will (almost) always be negative, again even though X is in fact >T. FIG. 4 illustrates the effect of the 0.1 measurement error at μ=0, where P(false negative) is not quite 0, and at μ=1, where P(false negative) is not quite 1.

Figure 5:
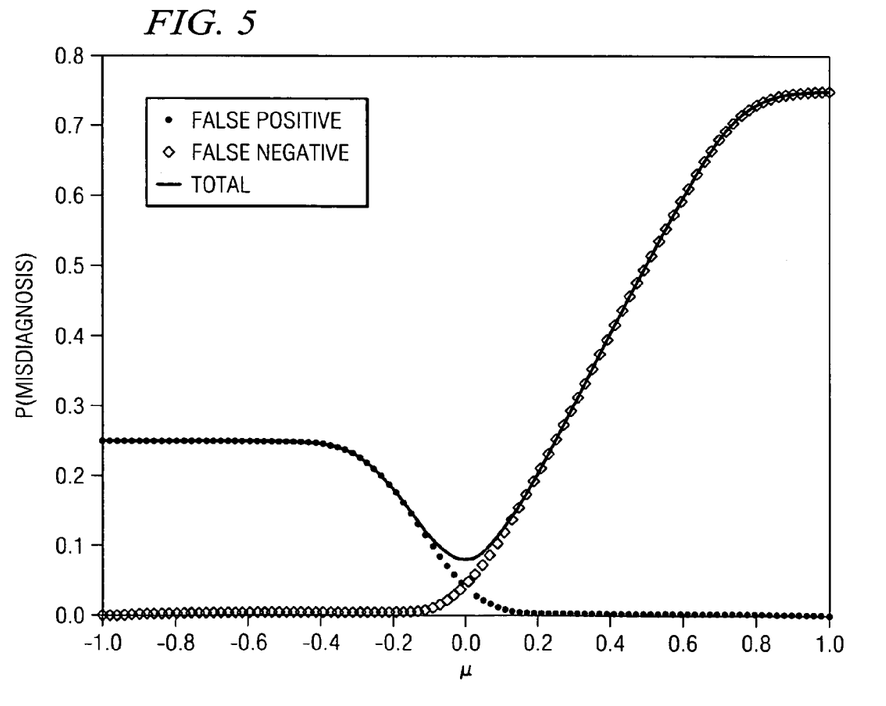

FIG. 5 shows an error probability graph for a threshold set at 0.25 Again, 0<X<1, so X>T about 75% of the time. It is now possible for a positive reading to be a false positive. If μ=−1, then FIG. 5 tests for Y>T−1, or Y>−¾, which is always true; but X>T only ¾ of the time, so ¼ of those readings are wrong, and the graph shows P(false positive)=0.25. Conversely, values of μ which are greater than 1 produce a 100% chance of a false negative. Note that at μ=0 the probability of a false negative and a false positive are equal. This shows that the existing common practice of ignoring measurement error can be used in the absence of any information. However, if the costs of a false negative and false positive are unequal, the optimum choice of μ would shift left or right. Setting μ=0.1 corresponds to the prior art practice of adding the standard deviation of the uncertainty to the threshold. As can be seen in the figure, this keeps P(false positive) near zero while raising P(false negative) as little as possible.

Figure 6:
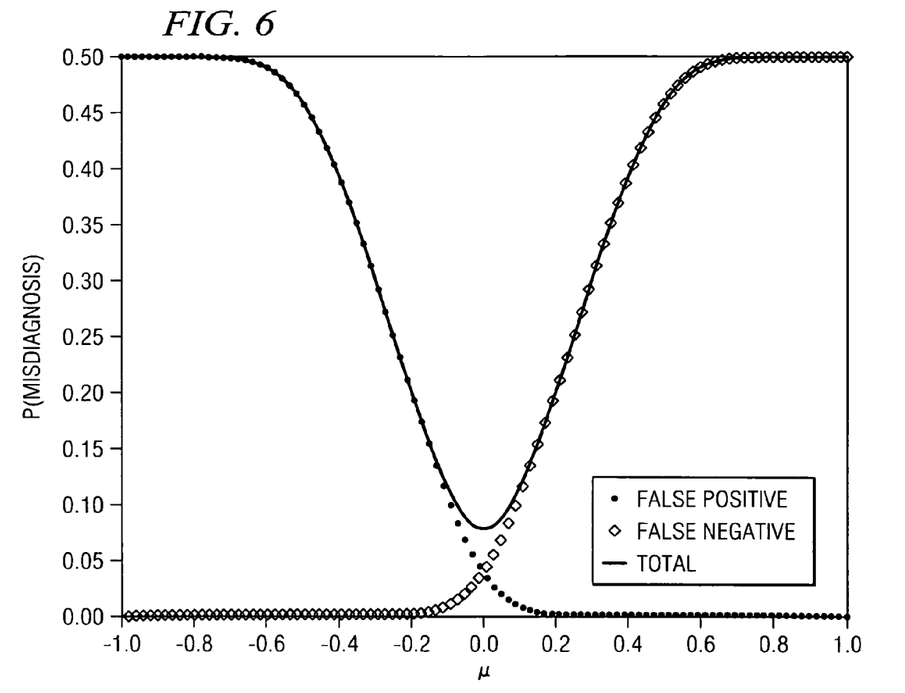

FIG. 6 shows an error probability graph for a threshold set at 0.5. FIG. 6 shows that the probability algorithm is unbiased: it treats false negatives and false positives equally, and μ>0 and μ<0 equally, and X>T and X<T equally.

Figure 7:
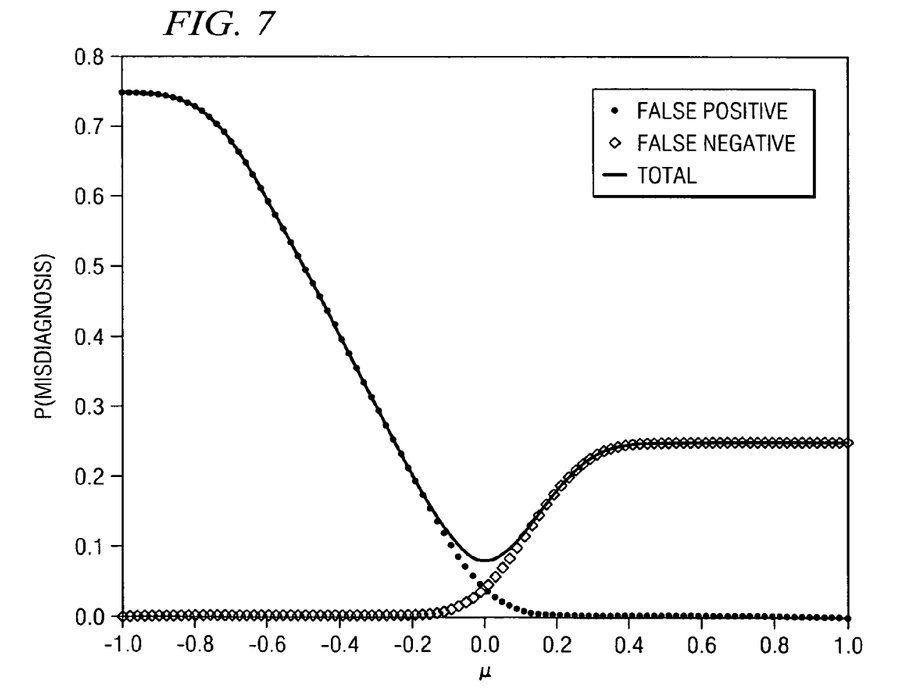

FIG. 7 shows an error probability graph for a threshold set at 0.75. The results of this scenario are the inverse of the results of FIG. 4. In this case, it is possible for a negative reading to be a false negative.

Figure 8:
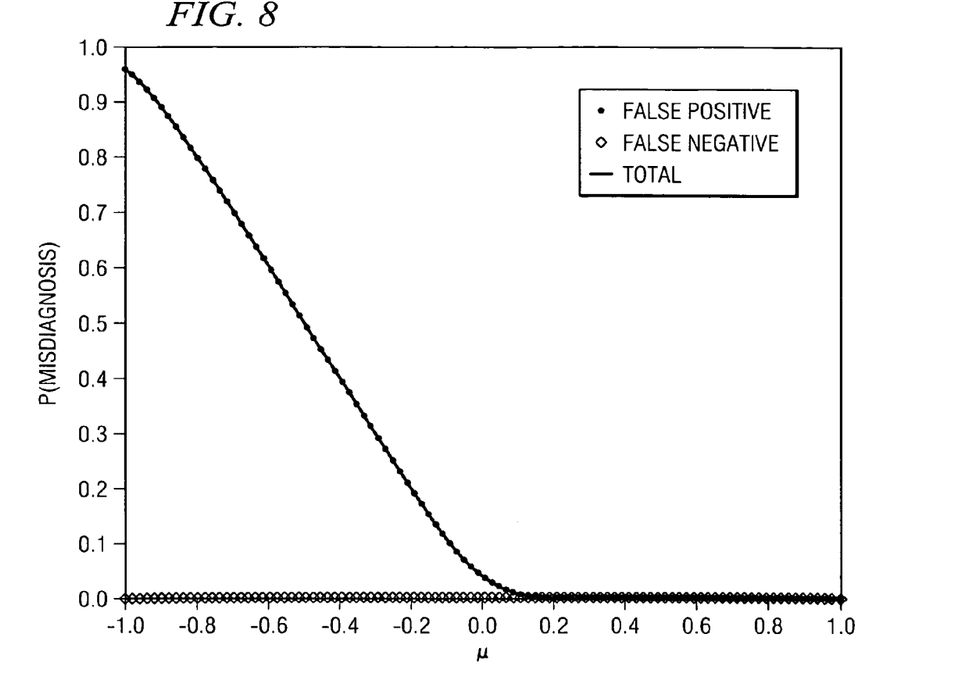

FIG. 8 shows an error probability graph for a threshold set at 1.0. The results of this scenario are the inverse of the results of FIG. 4. Since X is always less than the threshold, there is never a false negative in this case, as all values of X are less than the threshold. In other embodiments of the invention other values of μ than those used in FIGS. 4–8 are selected to minimize the expected loss from deciding whether a property is greater than a threshold, based on the measured value of the property.

Figure 9:
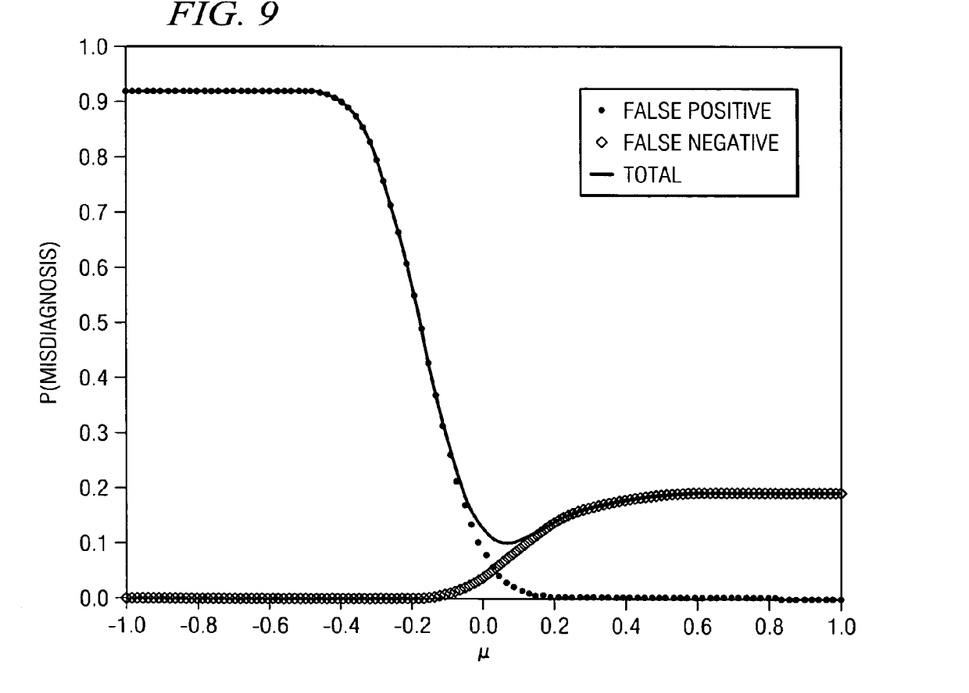

FIG. 9 shows an error probability graph with conditions similar to those in FIG. 5, but the distribution of actual values is no longer uniform. In this graph, the probability density function for actual values is $7e^{-7x}$, for 0<x<1. Thus, the density of X values is large near 0, and falls off rapidly above that. Since X is more likely to be small than large, a positive decision that X>T when Y>T is more likely to be a false positive than before. The probability of a misdiagnosis may be reduced by using a decision threshold of T+μ for a small positive μ. In FIG. 9, the optimum choice of μ is found at about 0.07. Note that this applies even though this example assumes that the costs of a false positive and false negative are equal.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for measuring comprising:
   measuring a physical property to obtain a measured value;
   calculating a distribution of actual values for the physical property;
   calculating an error distribution of the measured value;
   calculating a penalty associated with an erroneous decision to be made based at least in part on the measured value; and
   determining a margin of error in the measured value to be accounted for in making said decision based at least in part on the measured value, said determining based on an expected loss from selecting at least one possible actual value as a function of the calculated distribution of actual values, the calculated error distribution of the measured value, and the calculated penalty associated with an erroneous decision.

2. The method of claim 1 further comprising:
   measuring the physical property to obtain a second measured value; and
   comparing the second measured value to at least one threshold modified by the margin to generate a decision.

3. The method of claim 2 further comprising:
   reporting the decision based at least in part on the measured value.

4. The method of claim 2 wherein comparing comprises:
   determining if the second measured value compared to the at least one threshold is in a relationship selected from the group consisting of:
   greater than, less than, equal to, greater than or equal to, less than or equal to, and not equal to.

5. The method of claim 2 wherein the at least one threshold is variable.

6. The method of claim 2 wherein the at least one threshold is modified arithmetically with the margin.

7. The method of claim 1 wherein said margin determined minimizes the expected loss.

8. A computer program product comprising computer-readable code stored on computer-readable medium, said computer program product comprising:
   code for receiving a measured value of a physical property;
   code for calculating a distribution of actual values of the physical property;
   code for calculating an error distribution of the measured value;
   code for calculating a penalty associated with an erroneous decision to be made based at least in part on the measured value;
   code for determining a margin of inaccuracy in the measured value to be accounted for in making the decision based at least in part on the measured value, said determining based on an expected loss from selecting at least one possible actual value as a function of the calculated distribution of actual values, the calculated error distribution of the measured value, and the calculated penalty associated with an erroneous decision.

9. The computer program product of claim 8 further comprising:
   code for receiving at least a second measured value, at least one margin, and at least one threshold; and
   code for comparing said at least a second measured value to said at least one threshold modified by at least one margin to generate a decision.

10. The computer program product of claim 9 further comprising code for reporting the decision.

11. The computer program product of claim 9 further comprising:
    code for determining if the at least a second measured value compared to the at least one threshold modified by the at least one margin is in a relationship selected from the group consisting of:
    greater than, less than, equal to, greater than or equal to, less than or equal to, and not equal to.

12. The computer program product of claim 9 wherein said at least one threshold is a variable threshold.

13. The computer program product of claim 8 further comprising:
    code for determining said margin as a margin that minimizes the cost of measurement error.

14. An apparatus comprised of a computing device having at least one central processing unit and a memory coupled to said central processing unit, said computing device further comprising:
    means for measuring a physical property to obtain a measured value; and
    means for selecting a margin of inaccuracy in the measured value to be accounted for in making a decision based at least in part on the measured value said selecting based at least in part on an expected loss calculated from a distribution of actual values for the physical property, an error distribution of the measured value, and a penalty associated with said decision being erroneous.

15. The apparatus of claim 14 further comprising:
    means for setting at least one threshold; and
    means for comparing a second measurement of a physical property to said at least one threshold modified by a selected margin.

16. The apparatus of claim 15 comprising:
    means for determining if the second measurement compared to the set at least one threshold is in a relationship selected from the group consisting of:
    greater than, less than, equal to, greater than or equal to, less than or equal to, and not equal to.

17. The apparatus of claim 15 wherein said at least one threshold is a variable threshold.

18. The apparatus of claim 14 wherein said means for selecting comprises:
    means for selecting a margin that minimizes the expected loss.

19. The apparatus of claim 14 further comprising means communicatively connected to said computing device, said means selected from the group consisting of:
    means for controlling a process, means for monitoring a process, and combinations thereof.

20. The apparatus of claim 14 wherein said computing device is communicatively connected to at least one other computing device.

* * * * *

UNITED STATES PATENT AND TRADEMARK OFFICE
CERTIFICATE OF CORRECTION

| | | |
|---|---|---|
| PATENT NO. | : 7,899,646 B2 | |
| APPLICATION NO. | : 10/979387 | |
| DATED | : March 1, 2011 | |
| INVENTOR(S) | : Valery Kanevsky et al. | |

It is certified that error appears in the above-identified patent and that said Letters Patent is hereby corrected as shown below:

In column 12, line 32, in Claim 14, delete "value" and insert -- value, --, therefor.

Signed and Sealed this
Nineteenth Day of April, 2011

David J. Kappos
*Director of the United States Patent and Trademark Office*